(12) United States Patent
Behrens

(10) Patent No.: US 8,913,345 B1
(45) Date of Patent: Dec. 16, 2014

(54) SYSTEM AND METHOD FOR READING DATA FROM A MAGNETIC MEDIUM BY UTILIZING PLURAL READ SENSORS WHICH DEFINE AN EFFECTIVE READ WIDTH

(71) Applicant: Marvell International Ltd., Hamilton (BM)

(72) Inventor: Richard Travis Behrens, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/969,767

(22) Filed: Aug. 19, 2013

Related U.S. Application Data

(60) Provisional application No. 61/694,633, filed on Aug. 29, 2012, provisional application No. 61/767,046, filed on Feb. 20, 2013.

(51) Int. Cl.
  *G11B 5/265* (2006.01)
  *G11B 5/33* (2006.01)
  *G11B 5/02* (2006.01)

(52) U.S. Cl.
  CPC .................................... *G11B 5/02* (2013.01)
  USPC .......................................... 360/110; 360/121

(58) Field of Classification Search
  USPC .................. 360/110, 313, 314, 315, 316, 121
  See application file for complete search history.

(56) References Cited

U.S. PATENT DOCUMENTS

| | | | |
|---|---|---|---|
| 5,122,917 A | 6/1992 | Spainger | |
| 5,371,638 A * | 12/1994 | Saliba | 360/77.12 |
| 5,508,868 A * | 4/1996 | Cheng et al. | 360/321 |
| 5,754,354 A | 5/1998 | Tomita et al. | |
| 6,519,118 B2 | 2/2003 | Chang et al. | |
| 7,116,514 B2 * | 10/2006 | Mahnad et al. | 360/77.12 |
| 7,839,606 B2 | 11/2010 | Jayasekara | |
| 8,011,084 B2 | 9/2011 | Le et al. | |
| 2005/0134990 A1 * | 6/2005 | Tsuchiya | 360/63 |
| 2006/0028772 A1 * | 2/2006 | Raastad | 360/315 |
| 2007/0086109 A1 * | 4/2007 | Okafuji et al. | 360/77.12 |
| 2010/0309583 A1 * | 12/2010 | Saliba et al. | 360/134 |
| 2012/0327532 A1 * | 12/2012 | Biskeborn et al. | 360/75 |

* cited by examiner

*Primary Examiner* — Jefferson Evans

(57) ABSTRACT

Systems and methods for reading data from a magnetic medium are provided. A system for reading data from a magnetic medium includes an electromagnetic head array, where the electromagnetic head array includes a plurality of read sensors. Each read sensor of the plurality of read sensors is configured to sense a magnetic field of the magnetic medium and to generate a signal based on the magnetic field. Circuitry is configured to combine the signals of the plurality of read sensors to generate a resulting signal. The resulting signal defines an effective read width of the electromagnetic head array, where the effective read width is narrower than a read width of any of the plurality of read sensors.

22 Claims, 6 Drawing Sheets

SYSTEM AND METHOD FOR READING DATA FROM A MAGNETIC MEDIUM BY UTILIZING PLURAL READ SENSORS WHICH DEFINE AN EFFECTIVE READ WIDTH

CROSS-REFERENCE TO RELATED APPLICATIONS

This disclosure claims priority to U.S. Provisional Patent Application No. 61/694,633, filed on Aug. 29, 2012, and to U.S. Provisional Patent Application No. 61/767,046, filed on Feb. 20, 2013, which are incorporated herein by reference in their entireties.

TECHNICAL FIELD

The technology described in this document relates generally to magnetic heads for reading data written to a magnetic medium and more particularly to a read head array including a plurality of read sensors that are configured to define an effective read width of the read head array.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A computer disk drive retrieves and stores data by positioning magnetic read and write heads over a rotating magnetic data storage disk. The read and write heads, which are typically arranged in stacks, read data from and write data to, respectively, concentric data tracks defined on a surface of the disk. The heads may be included in structures called "sliders" onto which the read/write sensors of the magnetic heads are fabricated. The slider moves above the surface of the disk on a thin cushion of air. The read/write heads are connected to processing circuitry that operates under hardware or software control to implement the writing and reading functions. If data tracks are made narrower, more tracks will fit on a disk surface, and more data can be stored on a given disk. Generally, the width of the tracks depends on the widths of the read and write heads used. A decrease in track width caused by narrower read/write heads has allowed for increases in the recording density and data storage on disks.

SUMMARY

The present disclosure is directed to systems and methods for reading data from a magnetic medium. A system for reading data from a magnetic medium includes an electromagnetic head array, where the electromagnetic head array includes a plurality of read sensors. Each read sensor of the plurality of read sensors is configured to sense a magnetic field of the magnetic medium and to generate a signal based on the magnetic field. Circuitry is configured to combine the signals of the plurality of read sensors to generate a resulting signal. The resulting signal defines an effective read width of the electromagnetic head array, where the effective read width is narrower than a read width of any of the plurality of read sensors.

In another example, in a method for reading data from a magnetic medium, a plurality of signals from an electromagnetic head array are received. The electromagnetic head array includes a plurality of read sensors, where each read sensor of the plurality of read sensors is configured to sense a magnetic field of the magnetic medium and to generate a signal based on the magnetic field. The plurality of signals are combined to generate a resulting signal. The resulting signal defines an effective read width of the electromagnetic head array, where the effective read width is narrower than a read width of any of the plurality of read sensors.

DETAILED DESCRIPTION

Figure 1:
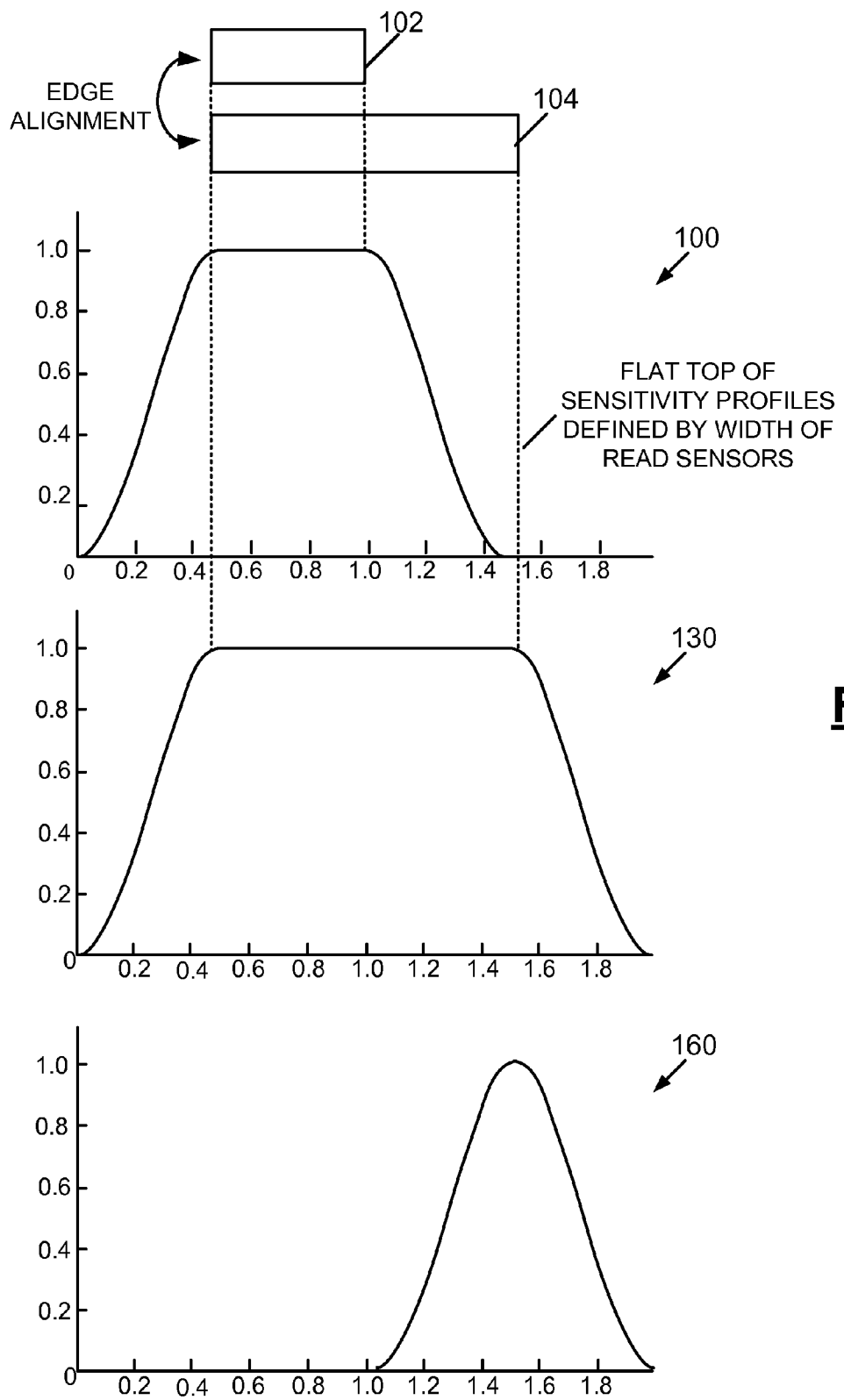
FIG. 1 depicts an example electromagnetic head array for reading data from a magnetic medium, where the electromagnetic head array includes a first read sensor and a second read sensor.

FIG. 1 depicts an example electromagnetic head array for reading data from a magnetic medium, where the electromagnetic head array includes a first read sensor 102 and a second read sensor 104. The example electromagnetic head array of FIG. 1 is in contrast to a conventional magnetic medium read element that includes only a single read sensor. Using the plurality of read heads 102, 104, the example electromagnetic head array of FIG. 1 can provide a read channel with a higher number of measurements and a greater amount of data. For example, in one implementation, one of the read sensors 102, 104 is centered over a desired track of a magnetic disk, and the other read sensor of the read sensors 102, 104 is offset from the center of the desired track. The offset read sensor allows the example electromagnetic head array to provide the read channel with additional data that can be used to mitigate inter-track interference (ITI). ITI may be, for example, interference that results from picking up magnetization from neighboring tracks as well as that of a desired track. For example, the off-center placement of the offset read sensor may be used to gather measurements of the ITI entering the read sensor that is centered over the desired track. The read sensors 102, 104 are each configured to sense a magnetic field of the magnetic medium and to generate a signal based on the magnetic field.

Each of the read sensors 102, 104 making up the example electromagnetic head array is described by a cross-track sensitivity profile. In FIG. 1, a first sensitivity profile 100 describes the first read sensor 102, and a second sensitivity profile 130 describes the second read sensor 104. A sensitivity profile indicates a degree to which a read sensor responds to the magnetic field at different parts of the read sensor. In the sensitivity profiles 100, 130, an x-axis corresponds to a distance in a cross-track direction, and a y-axis corresponds to read sensor sensitivity. The cross-track direction is defined across the width of a disk track, rather than along the track's length. As illustrated in FIG. 1, the sensitivity profile 100 of the narrower read sensor 102 is narrower than the sensitivity profile 130 of the wider read sensor 104. The sensitivity profiles 100, 130 illustrate that the sensors 102, 104 have a highest sensitivity directly under the sensors 102, 104, and that the sensitivity decreases as a distance away from the sensors 102, 104 increases. For example, if a magnetic element is located directly under the read sensors 102, 104, the read sensors 102, 104 will produce a large response, and if the magnetic element is not directly under the read sensors 102, 104, the read sensors 102, 104 produce a smaller response. The sensitivity may decrease, for example, exponentially or linearly.

The sensitivity profiles 100, 130 have a flat or approximately flat region between two track-edge transition regions. The flat tops of the sensitivity profiles 100, 130 are in contrast to sensitivity profiles having a Gaussian shape. Generally, the flat tops of the sensitivity profiles 100, 130 are a consequence of the size and geometry of the corresponding read sensors 102, 104. Rather than being relatively narrow, the read sensors 102, 104 have a geometry that includes a flat top across a width of the sensors 102, 104. The sensitivity profile indicates the degree to which the read sensor responds to the magnetic field under different parts of the read sensor, such that the sensitivity profile effectively defines a read width of the read sensor. The read width of the read sensor may be, for example, a thinnest width of a track that can be accurately read. Because the width of the read sensors 102, 104 defines a size and shape of the sensitivity profiles 100, 130, the width of the read sensors 102, 104 effectively determines the read width of the sensors 102, 104.

In the example of FIG. 1, the read sensors 102, 104 making up the electromagnetic head array have different widths in the cross-track direction and are aligned or approximately aligned at one edge (e.g., the left edge as depicted in FIG. 1). The relative widths of the read sensors 102, 104 cause a difference in width between the sensors 102, 104 to be less than (e.g., narrower than) a read width of either of the sensors 102, 104. The alignment or approximate alignment of the read sensors 102, 104 at the one edge causes the sensitivity profiles 100, 130 to coincide over a portion of their respective curves, such that the sensitivity profiles 100, 130 cancel each other out over the portion if a difference is taken between the profiles 100, 130. In the example of FIG. 1, the sensitivity profiles 100, 130 coincide for values along the x-axes between 0.0 and 1.0. As is illustrated in FIG. 1, although the read sensors 102, 104 are aligned at the one edge, the read sensors 102, 104 are not aligned at another edge (e.g., the right edge). Consequently, the sensitivity profiles 100, 130 do not coincide over other portions of their respective curves and do not cancel out over the other portions if a difference is taken between the profiles 100, 130.

A difference curve 160 is formed by subtracting the first sensitivity profile 100 from the second sensitivity profile 130. For example, the difference curve 160 may be formed by inverting the first sensitivity profile 100 and subsequently summing the inverted first sensitivity profile 100 and the second sensitivity profile 130. As described above, a coinciding portion of the sensitivity profiles 100, 130 is cancelled out in the difference curve 160, while a non-coinciding portion of the sensitivity profiles 100, 130 produces the non-zero portion of the curve 160. While the first and second sensitivity profiles 100, 130 define the read widths of the first and second read sensors 102, 104, the curve 160 representing the difference between the profiles 100, 130 is configured to represent an effective cross-track profile of a "virtual" read sensor.

Although aspects of the virtual read sensor are described above in terms of subtracting cross-track profiles, it is noted that the virtual read sensor is practiced by subtracting signals generated based on the read sensors 102, 104. The signals may be, for example, time varying voltages produced by circuits connected to the read sensors 102, 104, or the signals may be digital sample sequences generated from an analog to digital converter (ADC) that are representative of those time varying voltages. Thus, the description of the subtraction of the cross-track profiles 100, 130 is a method of analyzing the consequences of subtracting the signals. For example, the subtraction of cross-track profiles 100, 130 is a way of determining what the effective cross-track profile of the resulting subtracted signal will be. The virtual read sensor, however, is defined by the subtraction of the signals and is not defined by the subtraction of the cross-track profiles 100, 130. As described below, the virtual read sensor defined by the subtraction of the signals has a narrower read width than that of either of the physical sensors 102, 104.

By combining the physical read sensors 102, 104 of different widths and aligning one edge of the sensors 102, 104, the difference curve 160 formed by subtracting the cross-track profiles 100, 130 represents an effective read width for the electromagnetic head array that is narrower than that of either of the physical sensors 102, 104. For example, a cross-track resolution of the virtual read sensor defined by the difference curve 160 is higher than that of either of the physical read sensors 102, 104. In the example of FIG. 1, a read width of the first read sensor 102 is approximately equal to 1.5, and a read width of the second read sensor 104 is approximately equal to 2.0, as defined by the scale of the x-axes of the sensitivity profiles 100, 130. By contrast, a read width of the virtual read sensor represented by the difference curve 160 is equal to approximately 1.0, evidencing the higher resolution and narrower effective read width enabled by the virtual read sensor.

Although the example electromagnetic head array of FIG. 1 includes two physical read sensors 102, 104, in other examples, more than two physical read sensors are used. In each of the example implementations, combining signals produced by physical read sensors. The combination of the signals may be via addition, subtraction, scaling, and/or inversion operations and allows a virtual read sensor to be built, where the virtual read sensor has a narrower reading width than that of the physical read sensors. The scaling operation may include a multiplication of a signal by a constant to make the entire signal a different size. For example, signals A and B may be combined as 2*A−B, where the multiplication by 2 is a scaling operation. In magnetic recording, a figure of merit is areal density. The areal density may be defined as bits per unit area on the surface of a disk or tape. Areal density is a product of bit densities in each direction: (a) bit density along the track (e.g., bits per inch (BPI)) and (b) density of tracks (e.g., tracks per inch (TPI)). In general, to increase TPI (and hence, areal density), narrower heads with better resolution for writing and reading are used. However, producing narrower physical heads may become impractical or impossible as the sizes of the physical heads decrease. Thus, the virtual read sensor generated by combining signals of a plurality of physical read sensors may be used to read tracks that are narrower than a narrowest read head that can be physically fabricated.

The example electromagnetic head array may be coupled to a variety of components, including a preamplifier, read channel, processing circuitry, integrated circuit, memory, processor, or chip. The combining of the signals via the addition, subtraction, scaling, or inversion operation may occur in any of the variety of components to which the example electromagnetic head array is coupled.

Figure 2:
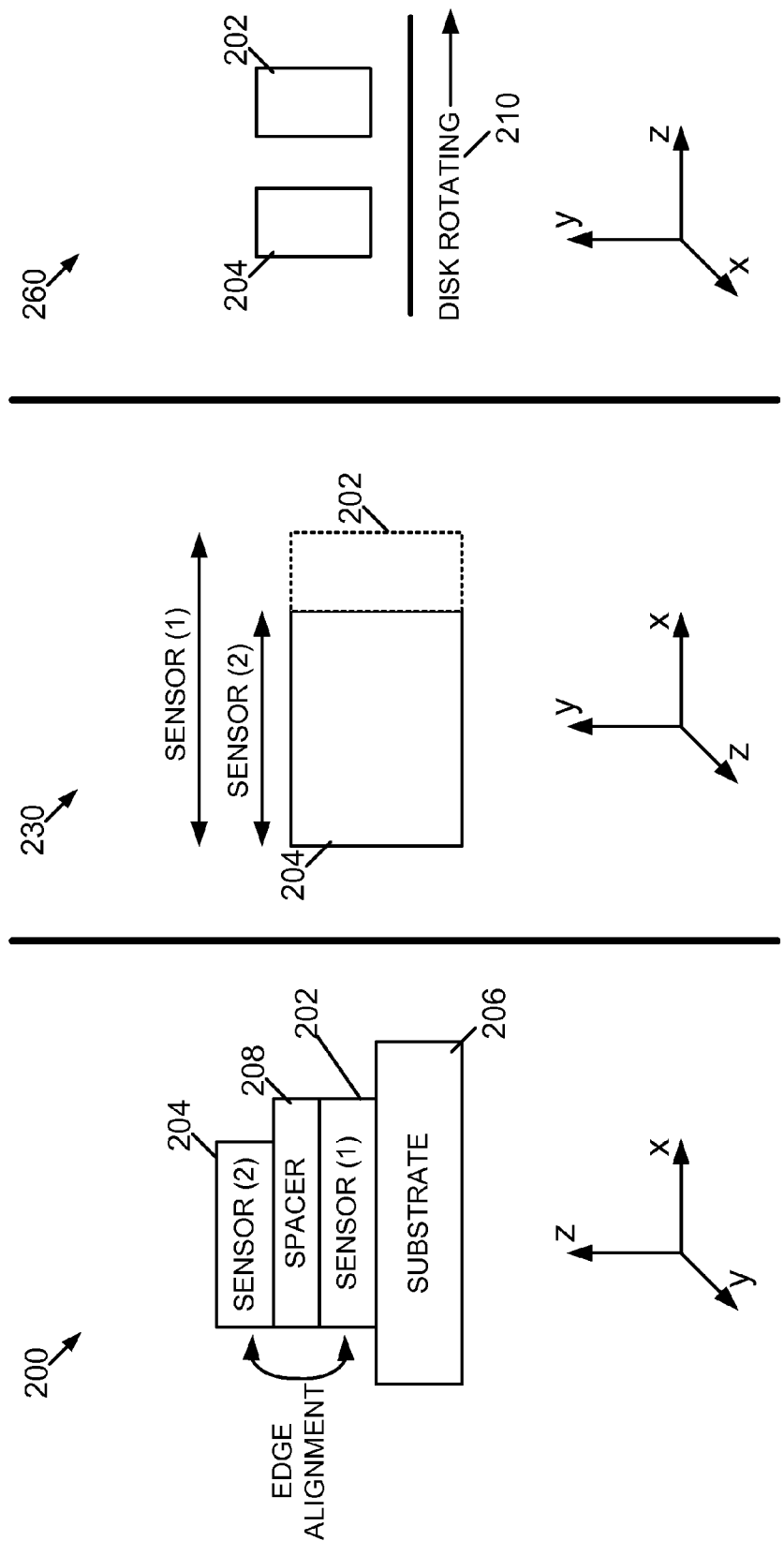
FIG. 2 depicts an example electromagnetic head array from three perspectives.

FIG. 2 depicts an example electromagnetic head array from three perspectives 200, 230, 260. At the first perspective 200, first and second physical read sensors 202, 204 are illustrated as being on top of a substrate 206 and separated from each other by a spacer layer 208. As is illustrated in the first perspective 200, the first and second read sensors 202, 204 are spatially aligned or approximately spatially aligned at an edge (e.g., the left edge as depicted in FIG. 2) and also include an edge (e.g., the right edge as depicted in FIG. 2) that is not aligned.

At the second perspective 230, the example electromagnetic head array has been rotated ninety degrees as versus the first perspective 200. The second perspective 230 is a top-down view of the read sensors 202, 204. The first read sensor 202, wider in the cross-track direction than the second read sensor 204, protrudes past the second read sensor 204 in the top-down view of the second perspective 230. At the third perspective 260, the example electromagnetic head array has been rotated ninety degrees as versus the second perspective 230. From the third perspective 260, the first and second read sensors 202, 204 appear similar in size and shape, but the first read sensor 202 has more depth in the x-direction than the second read sensor 204.

Also illustrated in the third perspective 260 is a rotating disk 210 that is depicted as rotating in the z-direction under the read sensors 202, 204. The rotating disk 210 may be, for example, a magnetic medium hard drive disk. A track width of the rotating disk 210 is defined along the x-direction, such that the varying widths of the read sensors 202, 204 along the x-direction will cause the read sensors 202, 204 to cover different portions of the track width. The third perspective 260 and its illustration of the disk 210 rotating in the z-direction shows a need for temporal alignment in generating a virtual read sensor by combining signals produced by the physical read sensors 202, 204 (e.g., as described above with reference to FIG. 1). The need for temporal alignment is caused by the fact that one of the physical read sensors 202, 204 receives a response from a given portion of the disk 210 before the other one of the read sensors 202, 204, due to the spatial separation between the sensors 202, 204 in the z-direction. Thus, in generating a difference curve between signals generated by the sensors 202, 204, the temporal alignment must be performed to ensure that the signals being subtracted correspond to responses associated with a same portion of the disk 210.

Other matching conditions, in addition to the above-described temporal alignment, may be used in generating the high resolution head array that results from combining signals of the physical read sensors. For example, an amplitude of the flat top portion of the signals generated by the physical sensors is matched. With reference to FIG. 1, the flat top portions of the sensitivity curves 100, 130 each have an amplitude of approximately 1.0 (as defined by the y-axis depicted in FIG. 1). Amplitude mismatch at the flat top portions of the signals causes a difference curve to be at an undesired, non-zero value at x values that might otherwise have difference values equal to zero. Such amplitude mismatch may be calibrated out during manufacturing of the head array or the hard drive utilizing the head array. Additionally, other post-processing efforts to address the amplitude mismatch may be performed in a variety of different components to which the head array is coupled. The components may be, for example, a preamplifier, read channel, or chip.

Figure 3:
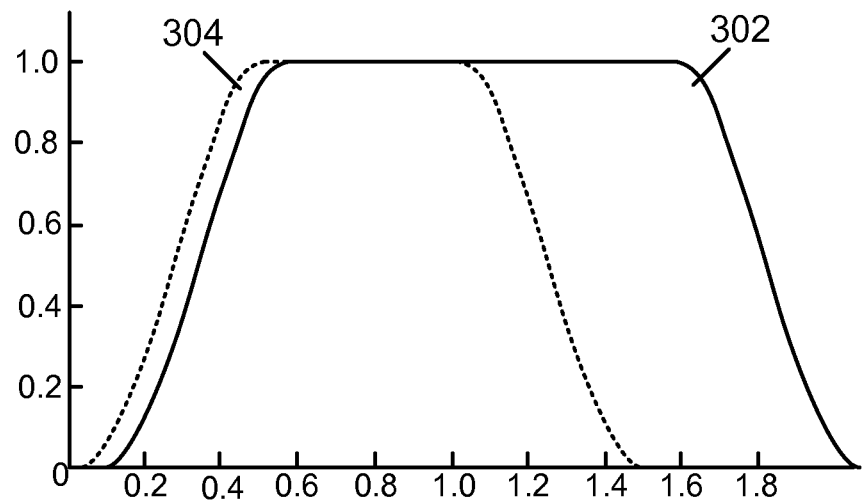
FIG. 3 depicts an effect of an edge alignment error on a difference curve generated by combining signals produced by two physical read sensors.
Figure 3:
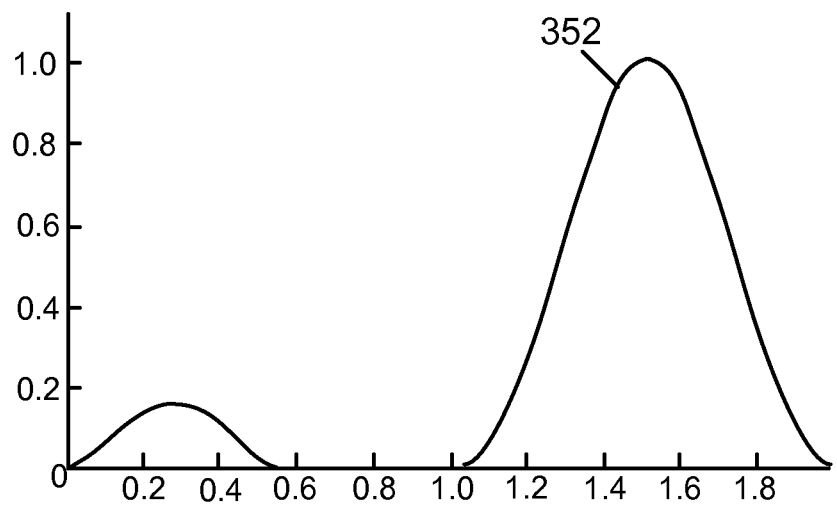

Another matching condition used in generating the high resolution head array is a position alignment of edges of the physical read sensors. FIG. 3 depicts an effect of an edge alignment error on a difference curve 352 generated by combining signals produced by two physical read sensors. In FIG. 3, sensitivity profiles 302, 304 correspond to the signals produced by the two physical read sensors. With reference to FIG. 1, the difference curve 160 shows that edges of the physical read sensors 102, 104 are properly aligned, such that the difference curve 160 has a value of zero at the x-values near the aligned edge. By contrast, however, the sensitivity profiles 302, 304 of FIG. 3, resulting from physical read sensors that are not properly aligned at an edge, have an undesired, non-zero response in the difference curve 352 between x values of 0.0 to 0.5.

In the example of FIG. 3, the sensitivity profile 302 is moved by 0.05 (as defined by the x-axis depicted in FIG. 3) to the right, such that the sensitivity profile 302 is no longer in alignment with the sensitivity profile 304. The undesired, non-zero response between the x values of 0.0 to 0.5 in the difference curve 352 functions as a form of interference and may cause inter-track interference (ITI). For example, the undesired response may cause a signal to be read from a neighboring track. ITI degrades system performance and may cause a higher read error rate, but some ITI may be tolerable as part of a system error budget specifying allowable ITI. Achieving proper alignment of the physical read sensors to have an allowable ITI depends on head array manufacturing tolerances.

Even if the alignment of the sensor edges is perfect or near perfect, effective error may be introduced by a skew angle. Skew is the angle of rotation of the head assembly with respect to the track of the magnetic medium being read. For example, the entire head assembly may be at a slight angle with respect to the track. Skew varies across the disk as a function of track radius. As described above, there is a distance between physical read sensors in a head array in an along-track direction. For example, with reference to FIG. 2, there is a distance between the read sensors 202, 204 in the z-direction along which the disk 210 rotates. For non-zero skew angles, this results in apparent misalignment of the edges of the sensitivity profiles of the physical read sensors and causes ITI.

A dual stage actuator may be used to provide independent control of skew and address issues caused by the skew by positioning the read sensors of the head array. A dual stage actuator has two pivot points: (a) a first pivot point used to move the heads from track to track, and (b) a second pivot point on an arm of the dual stage actuator that can be used to adjust a position of the heads in relation to the first pivot point. Using the two pivot points, the dual stage actuator may be used to control and keep the skew angle constant across the track radius. For example, the angle of the second pivot point may be varied as the head array moves from an inside of the disk to an outside of the disk, and vice versa.

The dual stage actuator can be used to control the skew angle to any particular value (e.g., not just zero skew), and using the dual stage actuator, actual misalignment of the physical read sensor edges may be effectively tuned out. Thus, rather than using the dual stage actuator to achieve zero skew, calibration can be used to determine the skew angle that gives a minimum ITI. The skew angle that gives a minimum ITI may be, for example, a skew angle that best cancels out the an alignment error in the physical read sensors. Adjusting the skew angle using the dual stage actuator can be used to ease the manufacturing tolerances for generating a high resolution head array.

Figure 4:
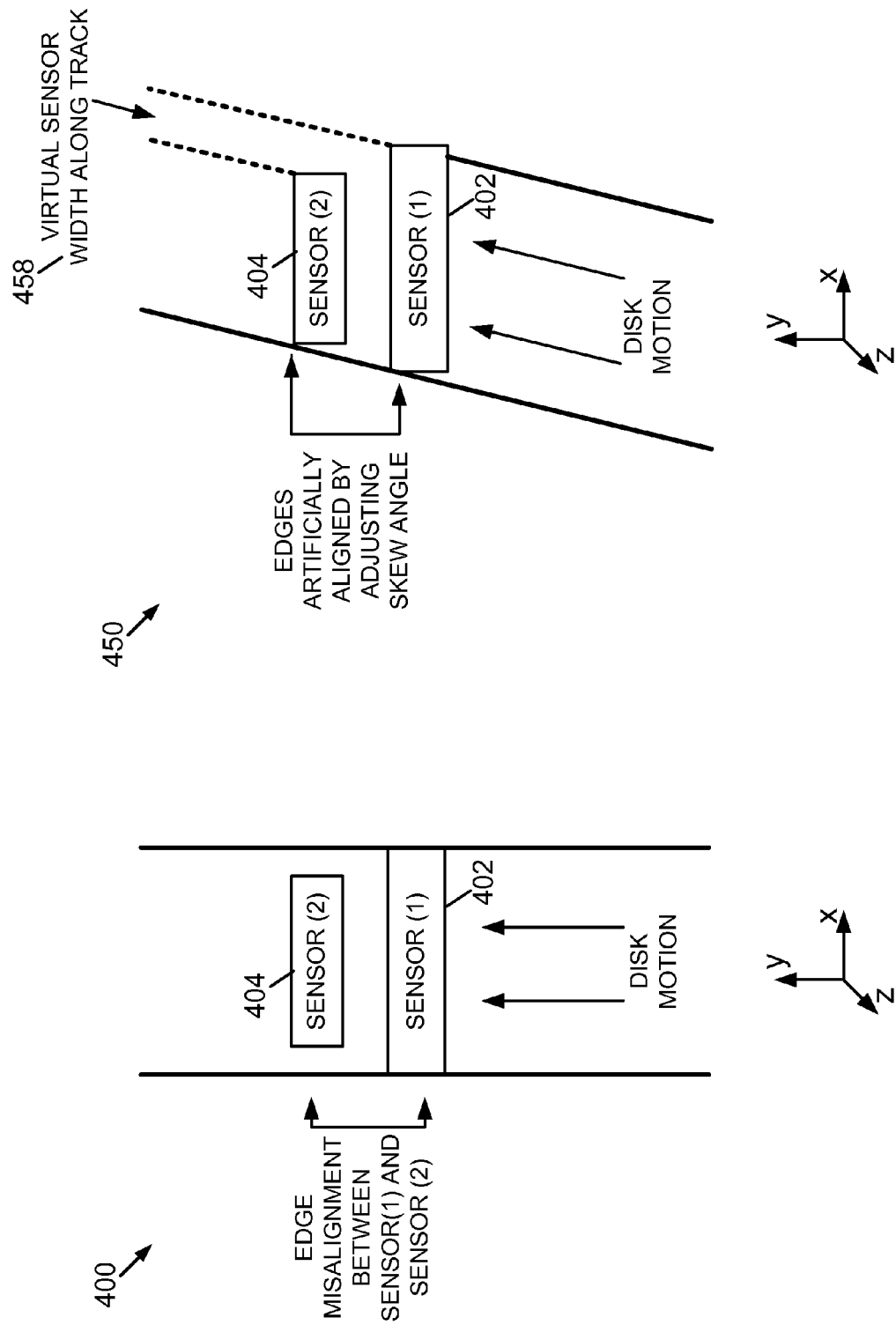
FIG. 4 illustrates use of a dual stage actuator to address an edge alignment error between physical read sensors.

FIG. 4 illustrates use of a dual stage actuator to address an edge alignment error between physical read sensors 402, 404. As illustrated at 400, an along-track direction is in a y-direction, and a cross-track direction is in an x-direction. The first physical read sensor 402 and the second physical read sensor 404 have varying widths, such that signals produced by the sensors 402, 404 can be combined to generate a resulting signal that defines an effective read width that is narrower than a read width of either of the physical read sensors 402, 404. However, as illustrated in FIG. 4, there is an edge misalignment between the sensors 402, 404. An effect of the edge misalignment between the physical read sensors is described above with respect to FIG. 3.

A dual stage actuator can be used to effectively tune out the misalignment of the physical sensors 402, 404. Using the dual stage actuator, an angle of a head array including the sensors 402, 404 may be varied with respect to the track. Thus, as illustrated at 450, when the angle of the head array including the sensors 402, 404 is rotated with respect to the track, the edges of the sensors 402, 404 are artificially aligned. Although an angle of the tract is depicted as being modified at 450, in practice, the angle of the head array is varied based on the dual stage actuator. By adjusting the angle of the head array in this manner, a calibration process is used to determine the skew angle that gives a lowest ITI. The skew angle that gives the lowest ITI may be the skew angle that best cancels the actual alignment error in the sensors 402, 404. With the edge misalignment tuned out, a virtual sensor 458 is formed along a width of the track where the subtracted signals of the sensors 402, 404 do not cancel.

Another matching condition used in generating the high resolution head array involves matching a shape of the physical read sensor edges to be aligned. Thus, shapes of the read sensor edges to be aligned are chosen to be the same shape or approximately the same shape. Achieving matching shapes of the physical read sensor edges within a required tolerance depends on head array manufacturing tolerances.

Another factor that affects performance of the high resolution head array is noise. When forming the high resolution head array by combining signals from a plurality of physical read sensors, there may be noise in one or more of the signals. Some of the noise originates from the magnetic medium or the process used to write data to the magnetic medium (i.e., media noise). In forming the high resolution head array, when such media noise occurs in the cancelled portions of the track width, the media noise will cancel along with the unwanted signal. The cancelled portions of the track width are the x values of the difference curve that have a value of zero. Other noise may originate from the physical read sensors or read path electronics. For example, the other noise may be white noise from a preamplifier when the magnetic medium is being read. Such read path noise is independent noise for each sensor of the plurality of physical read sensors, and the noise from the plurality of physical read sensors adds with each read sensor used. This may result in a 3 dB increase in a level of read path noise.

To illustrate the additive nature of the noise originating from the physical read sensors, a high resolution head array including two physical read sensors may be considered. The two physical read sensors are each connected to a separate preamplifier, and each of the two separate preamps contributes noise. When signals produced by the two physical read sensors are combined, the noise may combine in a way that increases an overall noise level by 3 dB. In typical hard drives, media noise may be dominant over read path noise, such that the 3 dB noise penalty thus does not apply to the dominant noise source. Additional post-processing may be used to address media noise or read path noise.

Figure 5:
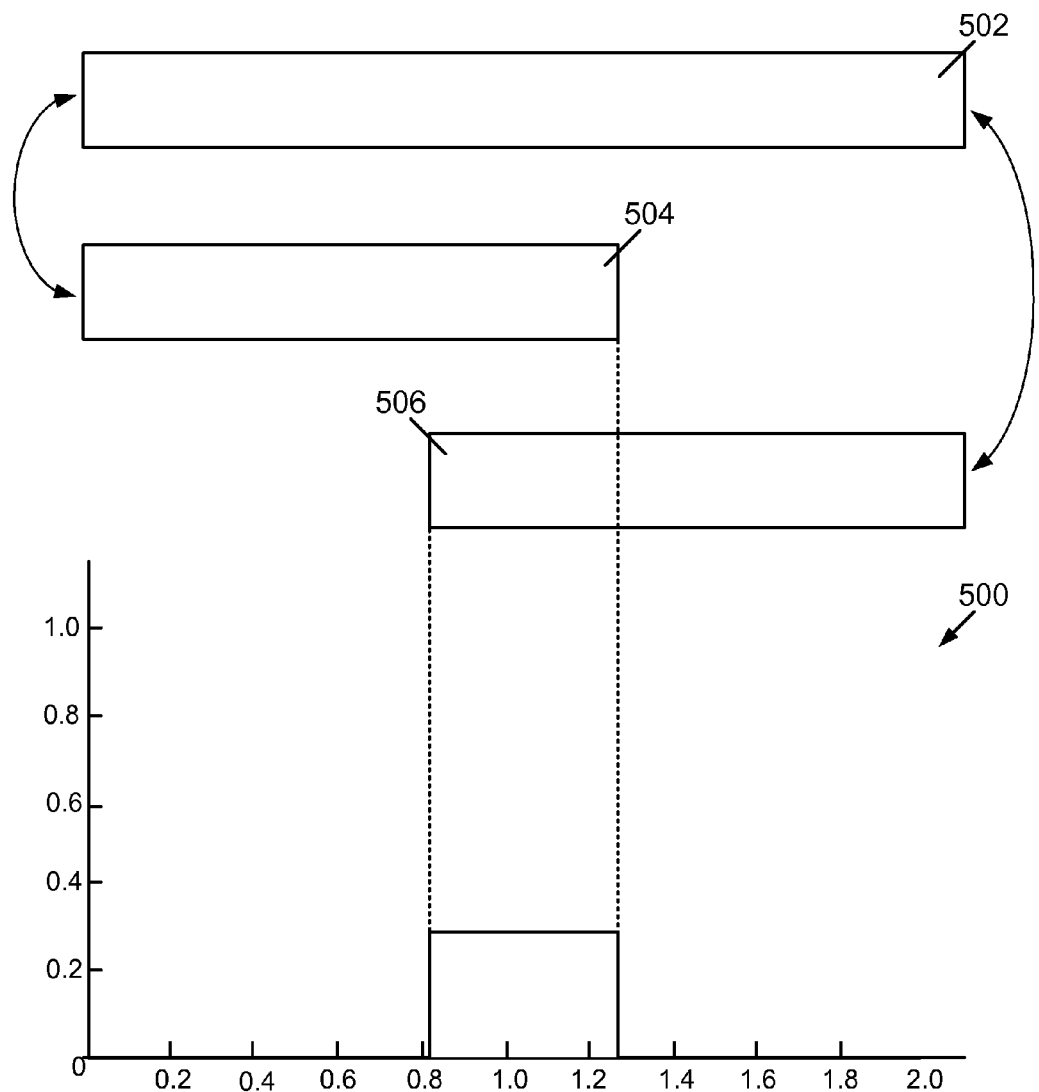
FIG. 5 depicts an example electromagnetic head array including a first read sensor, a second read sensor, and a third read sensor.

FIG. 5 depicts an example electromagnetic head array including a first read sensor 502, a second read sensor 504, and a third read sensor 506. As described above, more than two physical read sensors may be used in creating a high resolution head array. FIG. 5 includes the three read sensors 502, 504, 506, where a left edge of the second read sensor 504 is aligned with a left edge of the first read sensor 502, and a right edge of the third read sensor 506 is aligned with a right edge of the first read sensor 502. The first read sensor 502 has a width that is greater than widths of both the second read sensor 504 and the third read sensor 506. In one example, the high resolution head array with a narrow read width is formed by summing the signals produced by the second and third read sensors 504, 506 and subtracting the signal produced by the first read sensor 502 (e.g., [signal from the second read sensor 504]+[signal from the third read sensor 506]−[signal from the first read sensor 502]). Graph 500 illustrates this combination of the signals, where edges of the second and third read sensors 504, 506 that are not aligned with edges of the first read sensor 502 define an effective read width of the high resolution head array. The edges that determine the size and shape of the high resolution head array are different edges than those that require alignment. Alternatively, signals produced by the three sensors 502, 504, 506 are summed, with the signal produced by the first read sensor 502 being inverted prior to the summation.

The generalization of the high resolution head array design to more than two physical read sensors illustrates that various designs including a linear combination of multiple physical read sensors result in an effective read width that is narrower than that of any of the multiple physical read sensors. In the various designs, a virtual read sensor signal is formed by combining signals of the multiple physical read sensors. The combining may occur in a chip or chipset coupled to the head array, a read channel coupled to the head array, or a preamplifier coupled to the head array, among other locations.

Figure 6:
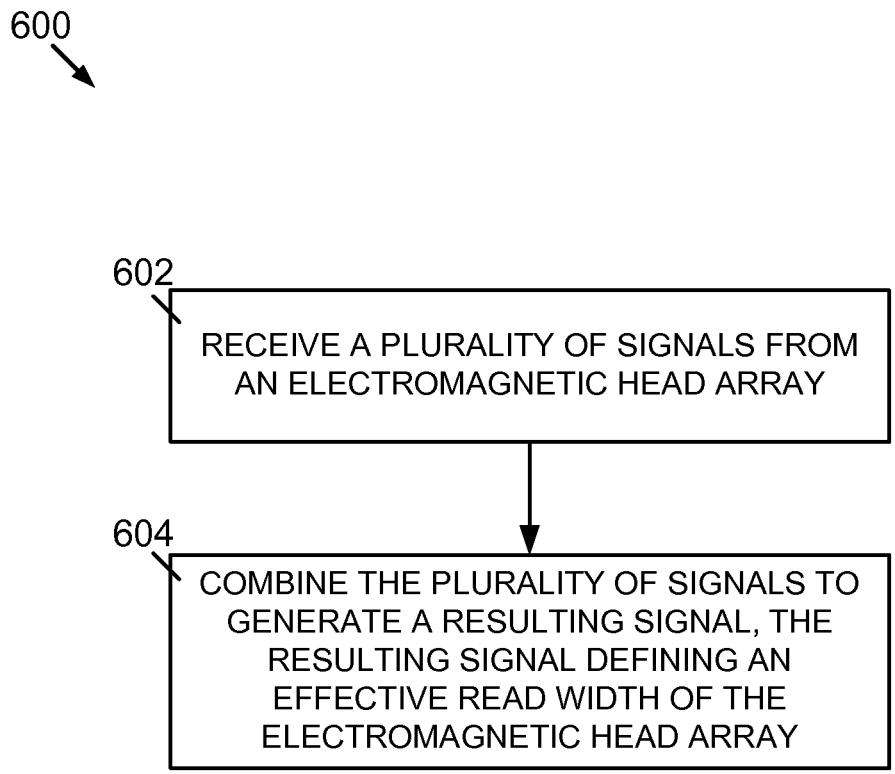
FIG. 6 is a flowchart illustrating an example method for reading data from a magnetic medium.

FIG. 6 is a flowchart 600 illustrating an example method for reading data from a magnetic medium. At 602, a plurality of signals are received from an electromagnetic head array, where the electromagnetic head array includes a plurality of read sensors. Each read sensor of the plurality of read sensors is configured to sense a magnetic field of the magnetic medium and to generate a signal based on the magnetic field. At 604, the plurality of signals are combined to generate a resulting signal. The resulting signal defines an effective read width of the electromagnetic head array that is narrower than a read width of any of the plurality of read sensors.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, registers, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A system for reading data from a magnetic medium, the system comprising:
   an electromagnetic head array, the electromagnetic head array including a plurality of read sensors, wherein each read sensor of the plurality of read sensors is configured to sense a magnetic field of the magnetic medium and to generate a signal based on the magnetic field; and
   circuitry configured to combine the signals of the plurality of read sensors to generate a resulting signal,
   wherein the resulting signal generated defines an effective read width of the electromagnetic head array, and wherein the effective read width is narrower than a read width of any of the plurality of read sensors.

2. The system of claim 1, wherein the signals of the plurality of read sensors are combined using at least one of an addition, subtraction, scaling, or inversion operation.

3. The system of claim 2, further comprising:
   a read channel with a plurality of inputs, wherein the signals of the plurality of read sensors are received at the plurality of inputs, and wherein the addition, subtraction, scaling, or inversion operation is executed in the read channel.

4. The system of claim 2, further comprising:
   a preamplifier comprising a plurality of inputs, wherein the signals of the plurality of read sensors are received at the plurality of inputs, and wherein the addition, subtraction, scaling, or inversion operation is executed in the preamplifier.

5. The system of claim 1, further comprising:
   the plurality of read sensors, wherein edges of two or more of the read sensors are spatially aligned, and wherein a difference in width between two or more of the read sensors is narrower than the read width of any of the plurality of read sensors.

6. The system of claim 1, further comprising:
   the plurality of read sensors including a first read sensor and a second read sensor, wherein an edge of the first read sensor is spatially aligned with an edge of the second read sensor in the electromagnetic head array, wherein a track width of the first read sensor is different than a track width of the second read sensor, and wherein the resulting signal is generated by subtracting a first signal produced by the first read sensor from a second signal produced by the second read sensor.

7. The system of claim 1, further comprising:
   the plurality of read sensors, wherein each read sensor of the plurality of read sensors has a geometry including a flat portion across a width of the read sensor, wherein the width of the read sensor determines the read width of the read sensor, and wherein the flat portion causes a sensitivity profile of each of the plurality of read sensors to be flat or approximately flat between two transition regions, and wherein the sensitivity profile indicates a degree to which the read sensor responds to the magnetic field under different parts of the read sensor.

8. The system of claim 1, further comprising:
   the plurality of read sensors, wherein each read sensor of the plurality of read sensors has a sensitivity profile indicating a degree to which the read sensor responds to the magnetic field under different parts of the read sensor, and wherein the plurality of read sensors are spatially arranged to cause a portion of a sensitivity profile of a first read sensor of the plurality of read sensors to coincide with a portion of a sensitivity profile of a second read sensor of the plurality of read sensors.

9. The system of claim 8, further comprising:
   the plurality of read sensors, wherein the plurality of read sensors are geometrically similar.

10. The system of claim 1, further comprising:
    a dual stage actuator configured to control a skew angle of the electromagnetic head array, wherein the skew angle is controlled to compensate for a spatial misalignment of one or more read sensors of the plurality of read sensors.

11. The system of claim 1, further comprising:
    the plurality of read sensors including a first read sensor, a second read sensor, and a third read sensor, wherein edges of the first read sensor are aligned with edges of the second and third read sensors, wherein edges of the second and third read sensors that are not aligned with the edges of the first read sensor define the effective read width, wherein a width of the first read sensor is greater than a width of the second read sensor, and wherein the width of the first read sensor is greater than a width of the third read sensor.

12. A method for reading data from a magnetic medium, the method comprising:
    receiving a plurality of signals from an electromagnetic head array, wherein the electromagnetic head array includes a plurality of read sensors, and wherein each read sensor of the plurality of read sensors is configured to sense a magnetic field of the magnetic medium and to generate a signal based on the magnetic field; and
    combining the plurality of signals to generate a resulting signal, wherein the resulting signal defines an effective read width of the electromagnetic head array narrower than a read width of any of the plurality of read sensors.

13. The method of claim 12, further comprising:
    receiving the plurality of signals from the plurality of read sensors, wherein edges of two or more of the read sensors are spatially aligned, and wherein a difference in width between two or more of the read sensors is narrower than the read width of any of the plurality of read sensors.

14. The method of claim 12, further comprising:
receiving the plurality of signals including a first signal generated by a first read sensor and a second signal generated by a second read sensor, wherein an edge of the first read sensor is spatially aligned with an edge of the second read sensor in the electromagnetic head array, and wherein a track width of the first read sensor is different than a track width of the second read sensor; and
generating the resulting signal by subtracting the first signal from the second signal.

15. The method of claim 12, further comprising:
receiving the plurality of signals from the plurality of read sensors, wherein each read sensor of the plurality of read sensors comprises a sensitivity profile indicating a degree to which the read sensor responds to the magnetic field at different parts of the read sensor, and wherein the plurality of read sensors are spatially arranged to cause a portion of a sensitivity profile of each read sensor of the plurality of read sensors to coincide with a portion of a sensitivity profile of another read sensor of the plurality of read sensors.

16. The method of claim 15, further comprising:
receiving the plurality of signals from the plurality of read sensors, wherein the plurality of read sensors are geometrically similar.

17. The method of claim 12, further comprising:
compensating for an amplitude mismatch in the plurality of signals, the compensating configured to cause each of the plurality of signals to have a similar maximum amplitude.

18. The method of claim 12, further comprising:
controlling a skew angle of the electromagnetic head array using a dual stage actuator, wherein the skew angle is selected to compensate for a spatial misalignment of one or more read sensors of the plurality of read sensors.

19. The method of claim 12, further comprising:
combining the plurality of signals using at least one of an addition, subtraction, scaling, or inversion operation.

20. The method of claim 19, further comprising:
receiving the plurality of signals at a first plurality of inputs of a read channel, wherein the addition, subtraction, scaling, or inversion operation is executed in the read channel; or
receiving the plurality of signals at a second plurality of inputs of a preamplifier, wherein the addition, subtraction, scaling, or inversion operation is executed in the preamplifier.

21. The method of claim 12, further comprising:
receiving the plurality of signals including a first signal generated by a first read sensor, a second signal generated by a second read sensor, and a third signal generated by a third read sensor, wherein edges of the first read sensor are aligned with edges of the second and third read sensors, and wherein edges of the second and third read sensors that are not aligned with the edges of the first read sensor define the effective read width; and
generating the resulting signal by subtracting the first signal from a sum of the second signal and the third signal.

22. The method of claim 21, further comprising:
receiving the plurality of signals including the first signal, the second signal, and the third signal, wherein a width of the first read sensor is greater than a width of the second read sensor, and wherein the width of the first read sensor is greater than a width of the third read sensor.

* * * * *